United States Patent
Brereton

(10) Patent No.: US 6,593,711 B2
(45) Date of Patent: Jul. 15, 2003

(54) ELECTRONIC CONTROL ARRANGEMENT

(75) Inventor: Richard Peter Brereton, Bournemouth (GB)

(73) Assignee: PG Drives Technology Limited, Dorset (GB)

( * ) Notice: Subject to any disclaimer, the term of this patent is extended or adjusted under 35 U.S.C. 154(b) by 12 days.

(21) Appl. No.: 10/055,462

(22) Filed: Jan. 23, 2002

(65) Prior Publication Data

US 2003/0080700 A1 May 1, 2003

(51) Int. Cl.[7] .............................................. H02P 1/54
(52) U.S. Cl. ........................ 318/34; 318/801; 388/907.2
(58) Field of Search ......................... 318/34, 739, 801, 318/812, 811, 809; 388/807, 907.2; 363/161

(56) References Cited

U.S. PATENT DOCUMENTS

| | | | | |
|---|---|---|---|---|
| 4,926,307 A | * | 5/1990 | Yang .......................... 363/161 |
| 5,287,046 A | * | 2/1994 | Carpenter et al. .......... 318/293 |
| 5,289,099 A | * | 2/1994 | Bahn .......................... 318/739 |
| 6,246,205 B1 | * | 6/2001 | Kujira et al. ............... 318/685 |
| 6,501,653 B1 | * | 12/2002 | Landsgestell et al. ....... 361/699 |

FOREIGN PATENT DOCUMENTS

GB        2273403 A        6/1994

\* cited by examiner

*Primary Examiner*—Karen Masih
(74) *Attorney, Agent, or Firm*—Vinson & Elkins L.L.P.

(57) ABSTRACT

A motorized assembly comprises first and second bridge circuits across which respective drive motors are connected. At least one auxiliary motor or actuator is connected between one arm of the first bridge circuit and one arm of the second bridge circuit and electronic control means are arranged to control the operation the drive motors and the or each auxiliary motor or actuator by operating electronic switches of the bridge circuits and an electronic switch connected in series with the or each auxiliary motor or actuator. Such an arrangement obviates the requirement for independent control circuitry for controlling the operation of the or each auxiliary motor or actuator, resulting in a reduction in the overall cost of the motorized assembly.

15 Claims, 2 Drawing Sheets

ELECTRONIC CONTROL ARRANGEMENT

FIELD OF THE INVENTION

The present invention relates to an electronic control arrangement wherein existing electronic motor control circuitry of a motorized assembly may be used to control one or more auxiliary devices.

BACKGROUND OF THE INVENTION

It is common practice to control the operation of a pair of electric motors, used to drive respective wheels of a motorized wheel-chair assembly, by varying the pulse width of a modulated signal applied to each motor.

Each motor is typically connected across a transistor bridge circuit, the transistors of which may be selectively switched to vary the direction in which the motor is rotated.

It is also common practice to provide such motorized wheel-chairs with further motors or other actuators, the operation of these devices being controlled by further electronic control circuitry, independent of that of the two main drive motors.

It is an object of the present invention to reduce the overall amount of electronic control circuitry required to control the operation of two main drive motors and at least one additional motor or other actuator of a motorized assembly.

BRIEF SUMMARY OF THE INVENTION

In accordance with the present invention, there is provided a motorized assembly comprising:

first and second bridge circuits, the two arms of each bridge circuit each comprising a first and a second electronic switch connected in series;

a respective drive motor connected between the two arms of each bridge circuit, at points intermediate the electronic switches of each of the two arms;

an auxiliary motor or actuator connected between one arm of the first bridge circuit and one arm of the second bridge circuit, at points intermediate the electronic switches of each of the two arms and in series with at least one electronic switch; and electronic control means arranged to operate the electronic switches to selectively control the operation of the drive motors and the auxiliary motor or actuator.

A third bridge circuit is thus effectively formed by said one arm of each of the first and second bridge circuits, the switch connected in series with the auxiliary motor or actuator serving as a means by which to electrically isolate the auxiliary motor or actuator, when one or both of the drive motors is/are being operated.

It will be appreciated that such an arrangement obviates the requirement for independent control circuitry for controlling the operation of the auxiliary motor or actuator, resulting in a reduction in the overall cost of the motorized assembly.

Preferably the motorized assembly comprises a motorized wheel-chair assembly, respective traction wheels of which are driven by the drive motors.

Preferably each electronic switch of the first and second bridge circuits comprises a transistor, which is preferably a Field Effect Transistor (FET) and is most preferably a Metal Oxide Semiconductor Field Effect Transistor (MOSFET).

Preferably the electronic switch connected in series with the auxiliary motor or actuator comprises a transistor, which is preferably a Field Effect Transistor (FET) and is most preferably a Metal Oxide Semiconductor Field Effect Transistor (MOSFET).

The auxiliary motor or actuator is preferably connected in series with and between two FET transistors. Preferably electronic control means of the assembly are arranged to operate the auxiliary motor or actuator by applying a control signal to the gates of each of the two FET transistors associated therewith and then switching the transistors of the first and second bridge circuits to apply a pulse-width modulated signal to one or other side of the auxiliary motor or actuator and to connect the opposite side of the auxiliary motor or actuator to ground.

A bootstrap capacitor is preferably connected between the source and gate of each of the transistors connected in series with the auxiliary motor or actuator, to ensure that the transistor via which the pulse-width modulated signal is applied will remain in a conducting state whilst the pulse-width modulated signal continues to be applied.

A resistor is preferably also connected between the source and gate of each of the transistors connected in series with the auxiliary motor or actuator, to provide a discharge path for its parallel capacitance, when a control signal ceases to be applied to the gate of the transistor, to arrest conduction between the drain and source of the transistor.

Also in accordance with the present invention, there is provided an electronic control arrangement for a motorized assembly and comprising:

first and second bridge circuits, the two arms of each bridge circuit each comprising a first and a second electronic switch connected in series;

a further electronic switch arranged to be connected in series with a motor or actuator between one arm of the first bridge circuit and one arm of the second bridge circuit, at points intermediate the electronic switches of each of the two arms; and electronic control means arranged to selectively operate the electronic switches.

The control arrangement may thus be used to selectively control the operation of respective drive motors, connected between the two arms of each bridge circuit, and of an auxiliary motor or actuator, connected in series with the further switch, between said one arm of the first and second bridge circuits.

Further in accordance with the present invention, there is provided a switching arrangement for connecting a motor or actuator to a pulse-width modulated supply, and comprising:

a Field Effect Transistor (FET) arranged to be connected in series with the motor or actuator; and a capacitor connected between the gate and source of the transistor, the capacitor forming a bootstrapped gate supply for maintaining conduction between the drain and source of the transistor whilst the pulse-width modulated supply is applied to the motor or actuator thereby.

Preferably the transistor comprises one of a pair of Field Effect Transistors (FETs), between and in series with which a motor or actuator may be connected, each transistor having a respective bootstrap capacitor connected between its gate and source for maintaining conduction of that transistor whilst a pulse-width modulated supply is applied to the motor or actuator thereby.

BRIEF DESCRIPTION OF THE DRAWINGS

Embodiments of the present invention will now be described by way of examples only and with reference to the accompanying drawings, in which.

DETAILED DESCRIPTION OF PREFERRED EMBODIMENTS OF THE INVENTION

Figure 1:
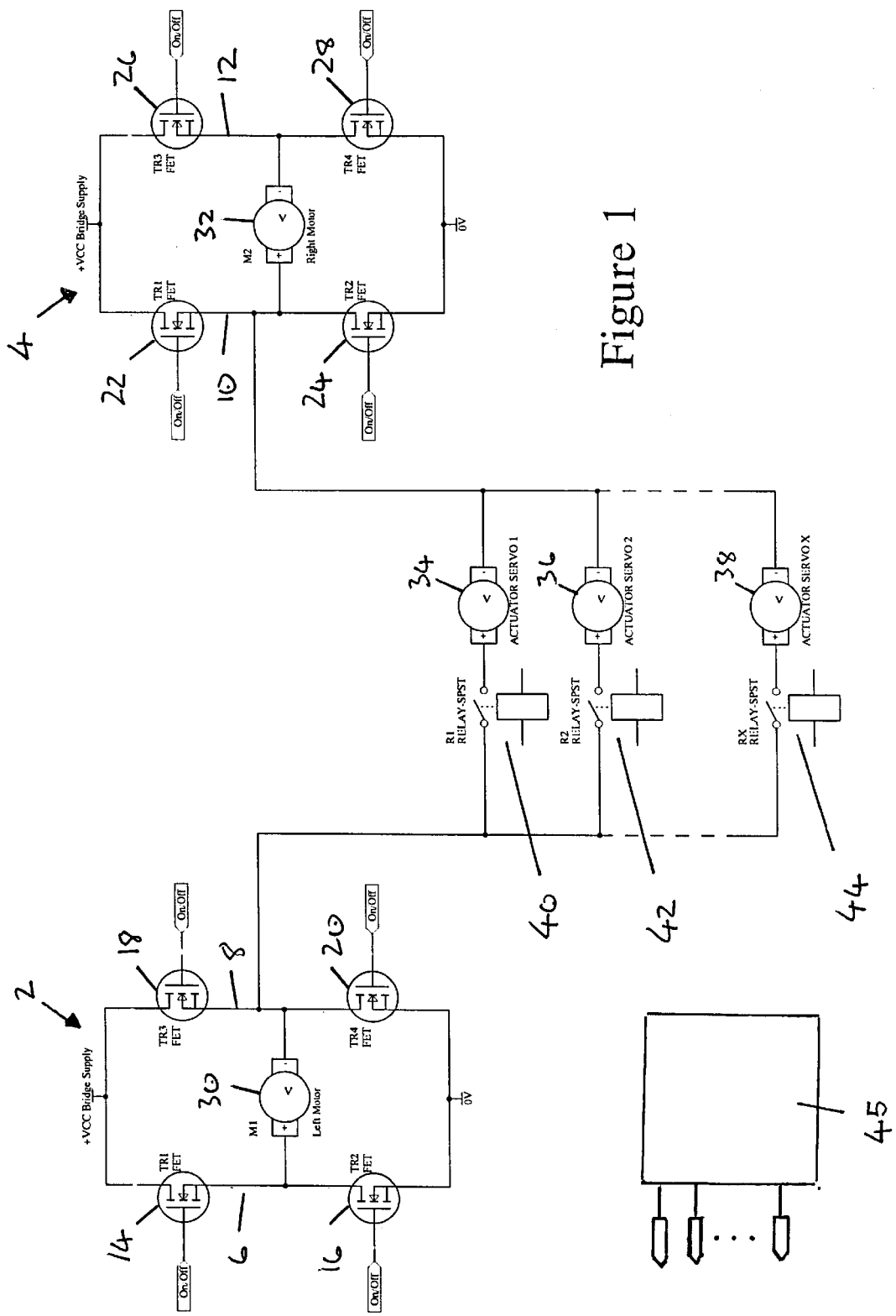
FIG. 1 is a circuit diagram of first embodiment of control arrangement in accordance with the present invention.

Referring to FIG. 1 of the drawings, an electronic control arrangement for a motorized wheel-chair assembly is shown, comprising first and second bridge circuits 2,4, the two arms 6-12 of each bridge circuit 2,4 each comprising a first and a second MOSFET transistor switch 14-28 connected in series.

A respective drive motor 30,32 is connected between the two arms 6-12 of each bridge circuit 2,4, at points intermediate the transistor switches 14-28 of each of the two arms, such that the transistors may be selectively switched to vary the direction in which each motor 30,32 is rotated and to control the speed of rotation of each motor 30,32 by pulse-width modulating the supply thereto.

A plurality of auxiliary servo-motors 34-38 are connected between one arm 8 of the first bridge circuit 2 and one arm 10 of the second bridge circuit 4, at points intermediate the electronic switches 18,20,22,24 of each of the two arms 8,10, each servo-motor 34-38 being connected in series with an electronic relay-switch 40-44.

A third bridge circuit, comprising the transistor switches 18,20,22 and 24, is thus effectively formed between one arm 8,10 of each of the first and second bridge circuits 2,4, with the relay-switches 40-44 serving as a means by which to electrically isolate their associated servo-motors 34-38, when either one or both of the drive motors 30,32 is/are being operated.

Electronic control means 45 are arranged to operate the transistor switches 14-28 of the two bridge circuits 2,4 and the relay-switches 40-44, to selectively control the operation of the drive motors 30,32 and the servo-motors 34-38.

More specifically, the electronic control means 45 are arranged such that, when one of the servo-motors 34-38 is to be operated, its associated relay-switch 40-44 is first closed and the transistors 18-24 forming the third bridge circuit then selectively switched to vary the direction in which the servo-motor 34-38 is operated and to control the speed of operation of the servo-motor 34-38 by pulse-width modulating the supply thereto. Meanwhile, to prevent the two drive motors 30,32 from operating, the transistor switches 14,16,26,28 of the opposite arms 6,12 of each of the first and second bridge circuits 2,4 are switched, either to produce a zero potential difference across each of the drive motors 30,32 or, more preferably, to electrically isolate the side of the motor to which they are connected.

Figure 2:
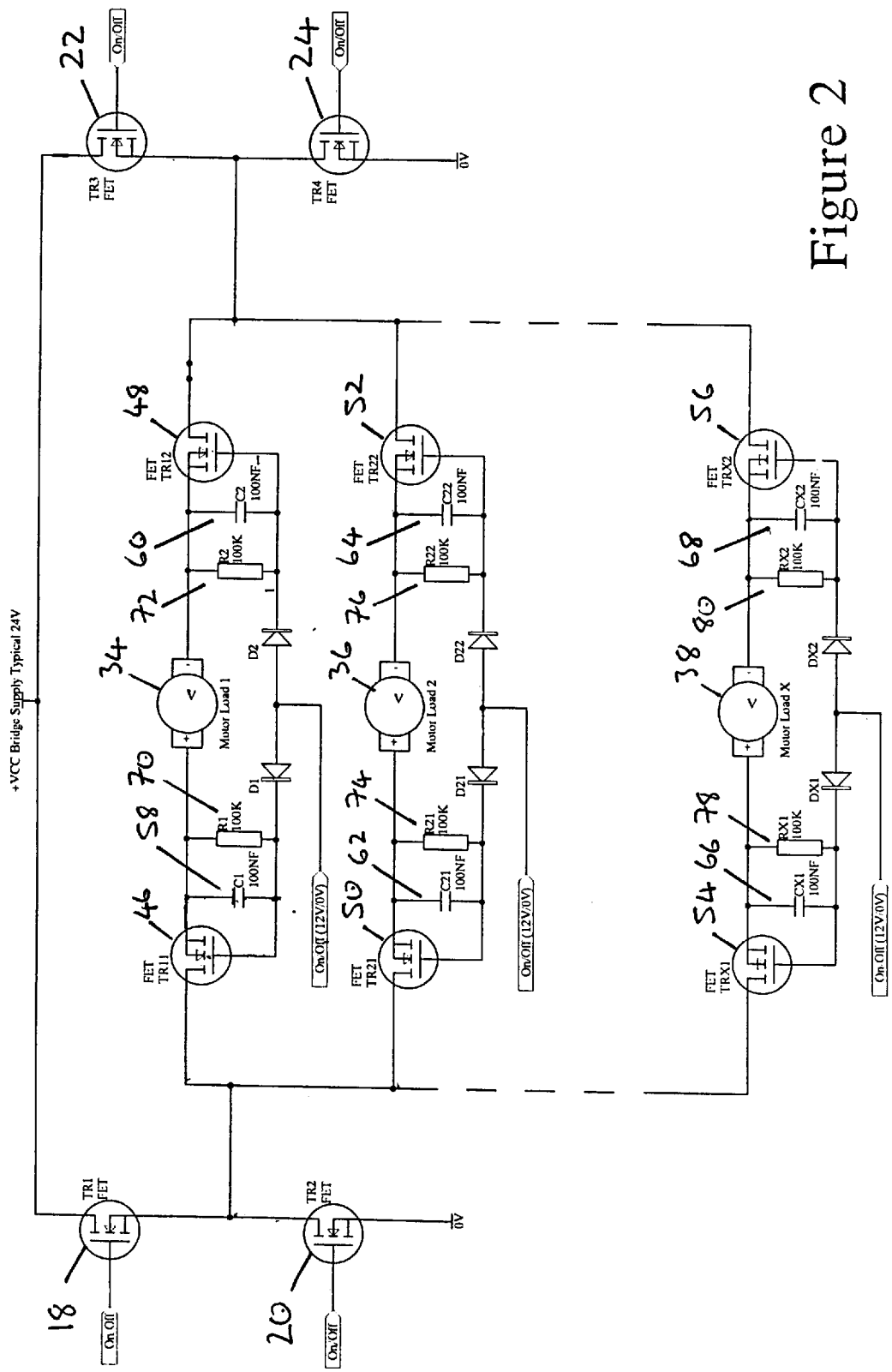
FIG. 2 is a circuit diagram of second embodiment of control arrangement in accordance with the present invention.

In the alternative embodiment of FIG. 2, each auxiliary servo-motor 34-38 is connected in series with and between two MOSFET transistors 46-56. To operate one of the servo-motors, e.g. 34, a 12 volt control signal is applied to the gates of each of the transistors 46,48 associated with that servo-motor, and the transistors 18-24 of the third bridge circuit switched, as required, to apply a pulse-width modulated, 24 volt supply signal to one side of the servo-motor (e.g. via transistor 18) and to connect the opposite side of the motor to ground (e.g. via transistor 24).

A 100 nanofarad bootstrap capacitor 58-68 connected between the source and gate of each transistor ensures that the transistor via which the modulated signal is applied will remain in a conducting state whilst the pulse-width modulated supply signal continues to be applied.

A 100 kilohm resistor 70-80, also connected between the source and gate of each transistor 46-56, provides a discharge path for its parallel capacitance 58-68, when a control signal ceases to be applied thereby, to arrest conduction between the drain and source of the transistor.

It will be appreciated that whilst a control arrangement comprising MOSFETs has been described, other types of electronic switch may instead be used to provide one or more of the electronic switches of the arrangement, with the control circuitry re-configured appropriately, according to known practices.

The control arrangements thus described obviates the requirement for independent control circuitry for controlling the operation of the or each auxiliary servo-motor, thereby allowing the overall cost of a motorized assembly having both a pair of drive motors and one or more auxiliary motors to be reduced.

What is claimed is:

1. A motorized assembly comprising:

first and second bridge circuits, the two arms of each bridge circuit each comprising a first and a second electronic switch connected in series;

a respective drive motor connected between the two arms of each bridge circuit, at points intermediate the electronic switches of each of the two arms;

an auxiliary motor or actuator connected between one arm of the first bridge circuit and one arm of the second bridge circuit, at points intermediate the electronic switches of each of the two arms and in series with at least one electronic switch; and electronic control means arranged to operate the electronic switches to selectively control the operation of the drive motors and the auxiliary motor or actuator.

2. A motorized assembly as claimed in claim 1, comprising a motorized wheel-chair assembly, respective traction wheels of which are driven by the drive motors.

3. A motorized assembly as claimed in claim 1, wherein each electronic switch of the first and second bridge circuits comprises a transistor.

4. A motorized assembly as claimed in claim 3, wherein said transistor comprises a Field Effect Transistor (FET).

5. A motorized assembly as claimed in claim 4, wherein said Field Effect Transistor (FET) comprises a Metal Oxide Semiconductor Field Effect Transistor (MOSFET).

6. A motorized assembly as claimed in claim 1, wherein the electronic switch connected in series with the auxiliary motor or actuator comprises a transistor.

7. A motorized assembly as claimed in claim 6, wherein said transistor comprises a Field Effect Transistor (FET).

8. A motorized assembly as claimed in claim 7, wherein said Field Effect Transistor (FET) comprises a Metal Oxide Semiconductor Field Effect Transistor (MOSFET).

9. A motorized assembly as claimed in claim 7, wherein the auxiliary motor or actuator is connected in series with and between two FET transistors.

10. A motorized assembly as claimed in claim 9, comprising electronic control means arranged to operate the auxiliary motor or actuator by applying a control signal to the gates of each of the two FET transistors associated therewith and then switching the transistors of the first and second bridge circuits to apply a pulse-width modulated signal to one or other side of the auxiliary motor or actuator and to connect the opposite side of the auxiliary motor or actuator to ground.

11. A motorized assembly as claimed in claim 10, wherein a bootstrap capacitor is connected between the source and gate of each of the transistors connected in series with the auxiliary motor or actuator, to ensure that the transistor via which the pulse-width modulated signal is applied will remain in a conducting state whilst the pulse-width modulated signal continues to be applied.

12. A motorized assembly as claimed in claim 11, wherein a resistor is also connected between the source and gate of each of the transistors connected in series with the auxiliary motor or actuator, to provide a discharge path for its parallel capacitance, when a control signal ceases to be applied to the gate of the transistor, to arrest conduction between the drain and source of the transistor.

13. An electronic control arrangement for a motorized assembly and comprising:

first and second bridge circuits, the two arms of each bridge circuit each comprising a first and a second electronic switch connected in series;

a further electronic switch arranged to be connected in series with a motor or actuator between one arm of the first bridge circuit and one arm of the second bridge circuit, at points intermediate the electronic switches of each of the two arms; and electronic control means arranged to selectively operate the electronic switches.

14. A switching arrangement for connecting a motor or actuator to a pulse-width modulated supply, and comprising:

a Field Effect Transistor (FET) arranged to be connected in series with the motor or actuator; and a capacitor connected between the gate and source of the transistor, the capacitor forming a bootstrapped gate supply for maintaining conduction between the drain and source of the transistor whilst the pulse-width modulated supply is applied to the motor or actuator thereby.

15. A switching arrangement as claimed in claim 14, wherein the transistor comprises one of a pair of Field Effect Transistors (FETs), between and in series with which a motor or actuator may be connected, each transistor having a respective bootstrap capacitor connected between its gate and source for maintaining conduction between the drain and source of the transistor whilst a pulse-width modulated supply is applied to the motor or actuator thereby.

* * * * *